(12) United States Patent
Larsen et al.

(10) Patent No.: US 9,106,436 B2
(45) Date of Patent: *Aug. 11, 2015

(54) HOME NETWORKING WEB-BASED SERVICE PORTAL

(75) Inventors: Brian Larsen, Bothell, WA (US); David Roberts, Redmond, WA (US); Aaron Wesley Cunningham, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/563,809

(22) Filed: Aug. 1, 2012

(65) Prior Publication Data

US 2013/0061297 A1 Mar. 7, 2013

Related U.S. Application Data

(63) Continuation of application No. 12/141,934, filed on Jun. 19, 2008, now Pat. No. 8,261,322.

(51) Int. Cl.
*H04L 29/06* (2006.01)
*H04L 12/28* (2006.01)

(52) U.S. Cl.
CPC ............ *H04L 12/282* (2013.01); *H04L 12/281* (2013.01); *H04L 12/2814* (2013.01); *H04L 63/08* (2013.01)

(58) Field of Classification Search
CPC ..... G06F 21/128; G06F 21/305; G06F 21/50; G06F 21/604; H04L 63/04; H04L 63/08; H04L 63/10; H04L 63/0428; H04W 12/08; H04W 12/10

USPC .......................... 726/3, 4; 709/220, 221, 222
See application file for complete search history.

(56) References Cited

U.S. PATENT DOCUMENTS 5,832,298 A 11/1998 Sanchez et al.
6,324,588 B1 11/2001 Desruisseaux et al.
(Continued)

OTHER PUBLICATIONS

Kim, et al., "Design and Implementation of Home Network Systems Using UPnP Middleware for Networked Appliances", IEEE transactions on consumer Electronics, Nov. 2002, pp. 963-972, vol. 48, Issue: 4.

(Continued)

*Primary Examiner* — Edward Zee
(74) *Attorney, Agent, or Firm* — Sunah Lee; Kate Drakos; Micky Minhas

(57) ABSTRACT

A web-based service portal provides a user interface to configure and/or access device(s) of a home network. The service portal can communicate with device(s) through application program interfaces (APIs). The service portal can provide a standardized user interface for specific feature(s) of a device. The service portal can further provide user authentication, device provisioning, and/or a user interface used to interact with device(s) in a home network. The service portal can established a trusted communication link between the portal and the device. The service portal can include a home control user interface component for providing a graphical representation of the home network and receiving user input and a device provisioning component that can discover and configure the device. The service portal can, optionally, include an authentication component that can authenticate a particular user's right to configure and/or access device(s) of a particular home network.

20 Claims, 8 Drawing Sheets

(56) References Cited

U.S. PATENT DOCUMENTS

| | | | |
|---|---|---|---|
| 6,732,179 B1 | 5/2004 | Brown | |
| 6,757,723 B1 | 6/2004 | O'Toole et al. | |
| 6,779,004 B1 | 8/2004 | Zintel | |
| 7,085,814 B1 | 8/2006 | Gandhi et al. | |
| 7,194,689 B2 | 3/2007 | Manni et al. | |
| 7,197,580 B2 | 3/2007 | Rosenbloom et al. | |
| 7,275,092 B2 | 9/2007 | Copp | |
| 7,283,623 B2 | 10/2007 | Burns | |
| 7,325,057 B2 | 1/2008 | Cho et al. | |
| 7,577,910 B1 | 8/2009 | Husemann | |
| 7,613,893 B2 | 11/2009 | Saint-Hilaire | |
| 8,261,322 B2* | 9/2012 | Larsen et al. | 726/3 |
| 2001/0042202 A1 | 11/2001 | Horvath | |
| 2002/0078161 A1 | 6/2002 | Cheng | |
| 2002/0111999 A1 | 8/2002 | Andersson | |
| 2002/0184165 A1 | 12/2002 | Deboer | |
| 2003/0018889 A1 | 1/2003 | Burnett | |
| 2003/0041142 A1 | 2/2003 | Zhang | |
| 2003/0105854 A1* | 6/2003 | Thorsteinsson et al. | 709/223 |
| 2003/0110262 A1* | 6/2003 | Hasan et al. | 709/226 |
| 2003/0236865 A1 | 12/2003 | Anthe et al. | |
| 2004/0111490 A1 | 6/2004 | Im et al. | |
| 2004/0133896 A1 | 7/2004 | Lym et al. | |
| 2005/0080897 A1 | 4/2005 | Braun et al. | |
| 2005/0152287 A1 | 7/2005 | Yokomitsu et al. | |
| 2005/0159823 A1* | 7/2005 | Hayes et al. | 700/19 |
| 2005/0160157 A1 | 7/2005 | Collier et al. | |
| 2005/0186913 A1 | 8/2005 | Varanda | |
| 2006/0080382 A1 | 4/2006 | Dutta et al. | |
| 2006/0155851 A1* | 7/2006 | Ma et al. | 709/226 |
| 2006/0235953 A1 | 10/2006 | Meier | |
| 2006/0259184 A1 | 11/2006 | Hayes et al. | |
| 2007/0143489 A1 | 6/2007 | Pantalone | |
| 2007/0179955 A1 | 8/2007 | Croft | |
| 2008/0218309 A1 | 9/2008 | Steenstra | |
| 2008/0270597 A1 | 10/2008 | Tenenti | |
| 2009/0320098 A1 | 12/2009 | Roberts | |

OTHER PUBLICATIONS

Miller, Brent A., "Home Networking with Universal Plug and Play", IEEE Communications Magazine, Dec. 2001, pp. 104-109, vol. 39, Issue: 12.

Non-Final Rejection, U.S. Appl. No. 12/141,938, dated Apr. 29, 2011, 18 pages.

Elrick et al., "Protocol and Interface for Device Control in the Home Environment", 2005, 145 pages.

Henderson et al., "Portable Design", retrieved from <<http://www.portabledesign.com/article_id=75>> on Apr. 9, 2008, Copyright 2007, 6 pages.

"Guestgate Internet Access Device", Model #523240, 2004, 2 pages.

Final Rejection, U.S. Appl. No. 12/141,938, dated Oct. 18, 2011, 20 pages.

Response to Non-Final Rejection, U.S. Appl. No. 12/141,938, dated Jul. 28, 2011, 10 pages.

Amendment to Final Rejection, U.S. Appl. No. 12/141,938, dated Feb. 17, 2012, 10 pages.

Non-Final Rejection, U.S. Appl. No. 12/141,938, dated May 31, 2012, 20 pages.

Notice of Allowance, U.S. Appl. No. 12/141,934, dated May 2, 2012, 9 pages.

Amendment to Non-Final Office Action, U.S. Appl. No. 12/141,934, dated Mar. 22, 2012, 12 pages.

Non-Final Rejection, U.S. Appl. No. 12/141,934, dated Dec. 22, 2011, 10 pages.

Amendment to Final Office Action, U.S. Appl. No. 12/141,934, Nov. 8, 2011, 11 pages.

Final Rejection, U.S. Appl. No. 12/141,934, Aug. 10, 2011, 9 pages.

Amendment to Non-Final Office Action, U.S. Appl. No. 12/141,934, Jun. 1, 2011, 12 pages.

Non-Final Rejection, U.S. Appl. No. 12/141,934, Mar. 2, 2011, 9 pages.

U.S. Appl. No. 12/141,938, Amendment dated Aug. 30, 2012, 9 pages.

U.S. Appl. No. 12/141,938, Final Rejection dated Jan. 4, 2013, 23 pages.

U.S. Appl. No. 12/141,938, Amendment dated Apr. 4, 2013, 9 pages.

U.S. Appl. No. 12/141,938, Non-Final Rejection dated Nov. 5, 2013, 23 pages.

U.S. Appl. No. 12/141,938, Amendment dated Feb. 5, 2013, 16 pages.

U.S. Appl. No. 12/141,938, Final Rejection dated Aug. 30, 2014, 26 pages.

U.S. Appl. No. 12/141,938, After Final Submission Under the After Final Consideration Pilot Program 2.0, dated Sep. 24, 2014, 7 pages.

U.S. Appl. No. 12/141,938, Notice of Allowance dated Oct. 2, 2014, 10 pages.

Provos, Niels, "Improving Host Security with System Call Policies," USENIX Security, vol. 3, 2003, 19 pages.

Andujar, C., "A Cost-Effective Approach for Developing Application-Control GUIs for Virtual Environments", IEEE Symposium, Mar. 25-29, 2006, 15 pages.

* cited by examiner

HOME NETWORKING WEB-BASED SERVICE PORTAL

CROSS-REFERENCE TO RELATED APPLICATIONS

This application claims priority to and is a continuation of co-pending U.S. patent application Ser. No. 12/141,934 entitled "Home Networking Web-Based Service Portal" and filed Jun. 19, 2008, which is incorporated herein by reference.

BACKGROUND

Home computer networks ("home networks") have become more common in recent year. Home networks provide the ability for users to communicate among and between various devices such as computers, printers, digital cameras, web cameras, sensors and the like.

Conventionally, configuring a home network has been difficult for a consumer. To successfully configure, use, and troubleshoot a home network, a user generally has some technical knowledge and basic understanding of networking protocols and features.

Currently, there is no standard way with which to interact with devices. Many home networking devices have an internal web utility that a user can employ to configure feature(s) of a particular device. Generally, these web utilities can be different for similar devices across different vendors and, in some cases, even for different products by the same vendor. For example, a setup user interface for a first router manufactured by a first entity can be different than a setup user interface for a second router manufactured by a second entity. Further, network setting(s) user interface for a router can be different than network setting(s) user interface for an Internet Protocol (IP) camera.

Once a home network has been configured, the user may need to configure a personal computer on the network, for example, to setup file and/or printer sharing. Additionally, the user can configure other feature(s), for example, that require changes to an operating system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosed architecture facilitates web-based configuration and/or access of device(s) on a home network. A web-based service portal provides a user interface to a device local to the home network. For example, the web-based service portal can communicate with the device(s) through use of a defined set of application program interfaces (APIs) of the device(s). The web-based service portal can provide a standardized user interface for specific feature(s) of a device. Optionally, the web-based service portal can provide a user interface designed for the home/basic user to facilitate configuration of device feature(s).

A computer-implemented system that facilitates configuration of a home network can include a web-based service portal. The web-based service portal can host information reported by device(s) for a specific network profile. The web-based service portal can further provide user authentication, device provisioning, and/or a user interface used to interact with device(s) in a home network. The web-based service portal includes a home control user interface component for providing a graphical representation of the home network and receiving user input.

The web-based service portal can, optionally, include an authentication component that can authenticate a particular user's right to configure and/or access device(s) of a particular home network (e.g., guest access, wireless security setup, etc.). For example, authentication can be based upon user credential(s) such as user name and/or a password. The authentication component can establish a trusted communication link between the web-based service portal and the device(s). The authentication component can further secure the device and the home network.

In one embodiment, the device is pre-configured with information to establish a trusted communication link (e.g., encrypted link) between the device and the web-based service portal. Once a user has been authenticated via the authentication component, a user can enter information associated with a device to be configured for a particular home network. For example, the information can be a serial number and password (e.g., provided by a manufacturer of the device).

Once the trusted communication link has been established, a device provisioning component can discover and configure the device. Based, at least in part, upon input received from a user, the device provisioning component can configure the device (e.g., access right(s), file sharing, name, device setting(s) and the like). For example, the device provisioning component can store an association between the device, a particular home network, and a particular user.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
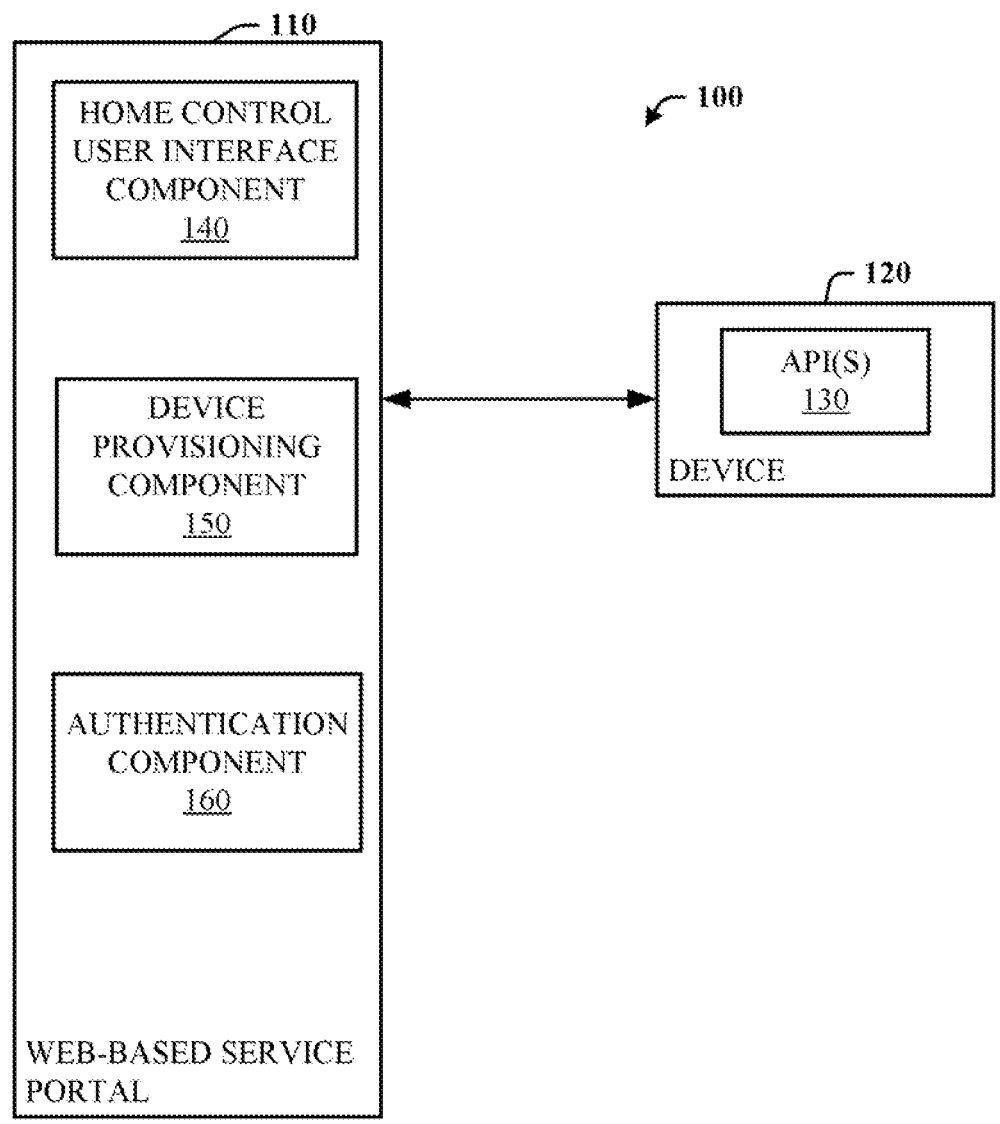
FIG. 1 illustrates a computer-implemented system that facilitates configuration of a home network.

The disclosed architecture facilitates web-based (e.g., remote) configuration and/or access of device(s) on a home network. A web-based service portal can provide a user interface to a device local to the home network. For example, the web-based service portal can communicate with the device(s) through use of a defined set of application program interfaces (APIs) of the device(s). The web-based service portal can provide a standardized user interface for specific feature(s) of a particular device. Optionally, the web-based service portal can provide a user interface designed for the home/basic user to facilitate configuration of device feature(s).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates configuration of a home network. The system 100 includes a web-based service portal 110 that can provide a web-based user interface to a device 120 local to the home network. For example, the web-based service portal 110 can communicate with the device(s) 120 through use of a defined set of application program interfaces (APIs) of the device(s) 120. The web-based service portal 110 can provide standardized user interface for specific features of a device 120.

The web-based service portal 110 can host information reported by device(s) 120 for a specific network profile. The web-based service portal 110 can further provide user authentication, device provisioning, and/or a user interface used to interact with device(s) 120 in a home network.

As noted previously, conventionally, there is no standard way with which to interact with the device(s) on a home network. For example, different versions of an operating system can provide different ways to configure a personal computer for a home network. Further, there is no standardized user interface for interacting with device(s) on a home network. Additionally, configuration conventionally occurred physically near the device, for example, via a personal computer on the same home network.

The system 100 provides a graphical user interface that allows user(s) to interact with device(s) on a particular home network, for example, using a simple drag and drop interface, right click functionality user interface, etc. The system 100 provides a web-based service portal 110 and thus minimizes a need for a local device 120 web-based user interface. For example, the web-based service portal can communicate with device(s) on the particular home network through application program interface(s) (APIs) 130 of the networked device(s) 120.

The web-based service portal 110 includes a home control user interface component 140 for providing a graphical representation of the home network and receiving user input. In one embodiment, the home control interface component 140 provides a graphical UI that allows user(s) to interact with device(s) 120 of an associated home network using a drag and drop operation and/or right click option(s). In this embodiment, to setup file and/or printer sharing from a network attached storage (NAS) device, a user can locate an icon associated with the NAS on a graphical user interface provided by the home control user interface component 140. The user can then right click on the icon and select "share". If the user desires simple sharing, the user can choose the default values. If the user desires to specify specific sharing rights setup, the user can invoke a standard wizard from the same right-click option. The user can further make changes to network setting(s) of device(s) 120 via the graphical UI.

In this embodiment, the home control user interface component 140 provides a way for the user to interact with the NAS on a particular home network without having to log into a web user interface of the NAS. In this manner, the user can be guided through the setup process from a simple right-click action.

The web-based service portal 110 can, optionally, include an authentication component 160 that can authenticate a particular user's right to configure and/or access device(s) 120 of a particular home network (e.g., guest access, wireless security setup, etc.). For example, authentication can be based upon user credential(s) such as user name and/or a password. The authentication component 160 can establish a trusted communication link between the web-based service portal 110 and the device(s) 120. The authentication component 160 can further secure the device 120 and the home network.

In one embodiment, the device 120 is pre-configured with information to establish a trusted communication link (e.g., encrypted link) between the device 120 and the web-based service portal 110. Once a user has been authenticated via the authentication component 160, a user can enter information associated with a device 120 to be configured for a particular home network. For example, the information can be a serial number and password (e.g., provided by a manufacturer of the device 120).

Once the trusted communication link has been established, a device provisioning component 150 can discover and configure the device 120. Further, based, at least in part, upon input received from a user, the device provisioning component 150 can modify the configuration of the device 120 (e.g., access right(s), file sharing, name, device setting(s) and the like). For example, the device provisioning component 150 can store an association between the device 120, a particular home network, and a particular user.

The device provisioning component 150 can register new device(s) 120 to a specific network and automatically configure those device(s) 120, if custom setting(s) have been pre-defined in a network profile (e.g., stored in the web-based service portal 110). Once the device 120 has been provisioned, the device 120 can be managed by the web-based service portal 110 (e.g., automatically) and from the home control user interface component 140, if the user desires to make a manual change to the device 120.

The APIs 130 can provide a flexible control scheme that can be defined to allow and/or deny access to feature(s) and/or function of the device 120. In one embodiment, the device 120 includes a set of pre-defined APIs 130 that allows the web-based service portal 110 to communicate with the device 120. The APIs 130 provide a standard communication protocol between the device 120 and the web-based service portal 110. For example, the APIs 130 can be XML-based and transported over a secure connection (e.g., https).

In another embodiment, the APIs 130 facilitate communication between the device 120 and the web-based service portal 110 via an Internet accessible protocol, for example, based on the Hypertext Markup Language (HTML). The APIs 130 are integrated into the device 120 such that user interface for the device 120 can be hosted in the web-based service portal 110.

The web-based service portal 110 can thus provide a unified interface for user(s) to configure device(s) 120 connected to a home network. For example, from the web-based service portal 110, a user can configure devices 120 from different manufacturers which use different protocols. Accordingly, user frustration with configuration and/or management of the home network can be greatly reduced.

In one embodiment, the web-based service portal 110 provides a standardized device user interface. Thus, if a user desires to manually configure a device 120, the user can use the standard user interface regardless of the device 120. For example, a network settings user interface for infrastructure devices 120 can be the same—router, access point, etc.

In one embodiment, the web-based service portal 110 can provide logic to ensure that a user does not make manual settings change(s) that will cause conflicts with the general network settings and/or any other computer system or device settings on the network. For example, the web-based service portal 110 warn the user if the user tried to change the IP address of a device 120 to one that did not match an IP range defined by a router of the home network.

Optionally, the graphical representation presented by the home control user interface component 140 can be branded to represent a vendor of the device 120, for example, while the user interface still maintains a standard appearance for functional configuration. The web-based service portal 110 can also allow the user interface to be localized into different language(s), as needed, and without requiring another firmware image on the device 120.

Figure 2:
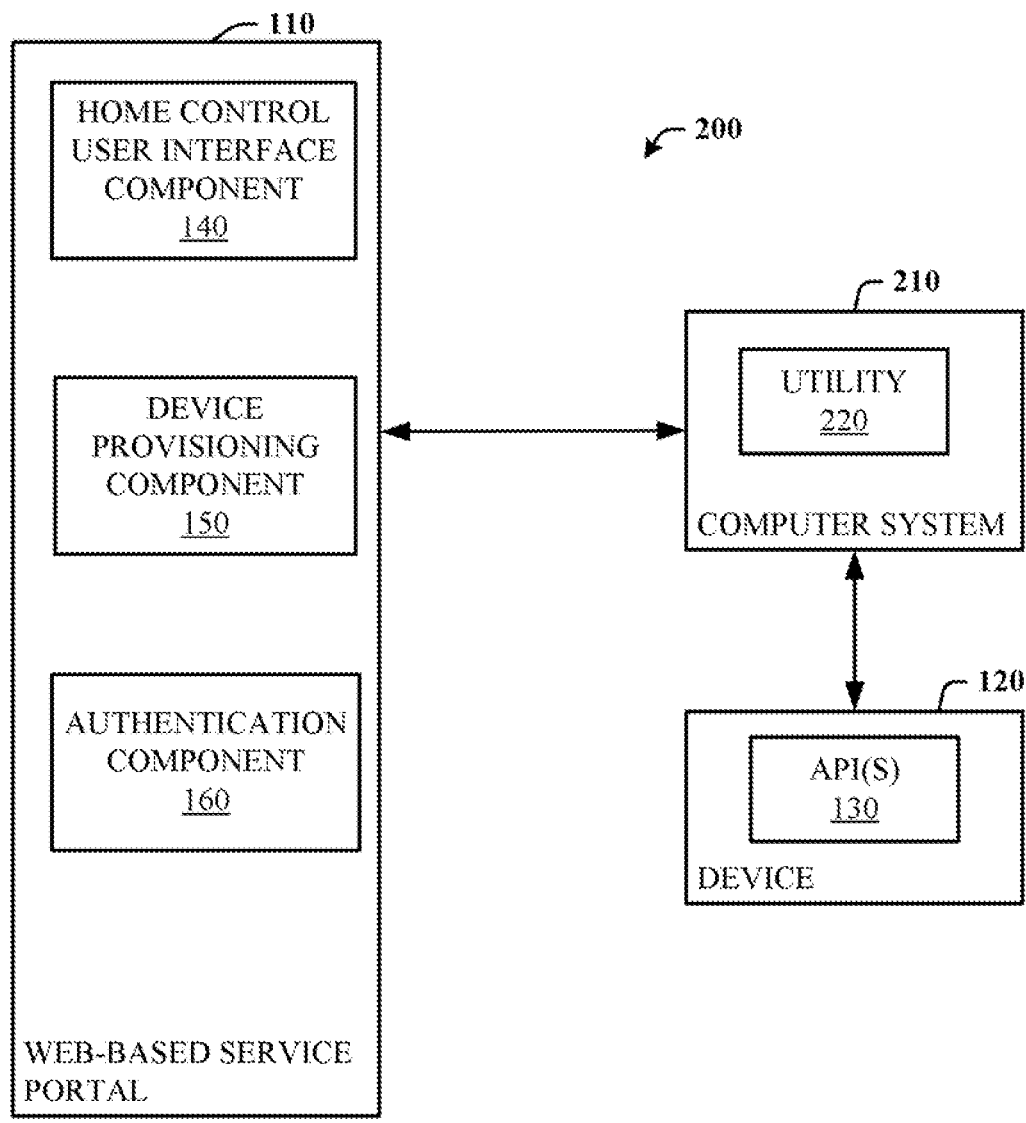
FIG. 2 illustrates a computer-implemented system that facilitates configuration of a home network.

FIG. 2 illustrates a computer-implemented system 200 that facilitates configuration of a home network. The system 200 includes a web-based service portal 110 having a home control user interface component 140, a device provisioning component 150 and, an authentication component 160, as discussed previously.

The system 200 further includes a computer system 210 with a communication utility 220 that provides a secure communication link between the computer system 210 and the web-based service portal 110. The communication utility 220 can provide an alternative interface for setting up file sharing, printer sharing and/or other function(s) that are designed specifically for a basic/home user.

The communication utility 220 can provide a communication interface with a device 120, the web-based service portal 110, and/or other utility(ies) on the network. In one embodiment, a user can configure the device 120 locally through the communication utility 220 and APIs 130 (e.g., if an Internet connection is not available).

The communication utility 220 can also allow a user to configure specific network setting(s) of the computer system 210, for example, setting up file sharing and/or printer sharing. Optionally, other information can be reported through the communication utility 220 to the web-based service portal 110, for example, health information of the computer system 210, firewall status, and general computer system information. Accordingly, a user can monitor a home network from a single location on the Internet and make appropriate change(s), if necessary. In one embodiment, the communication utility 220 can provide application programming interface(s) accessible to the web-based service portal 110.

Figure 3:
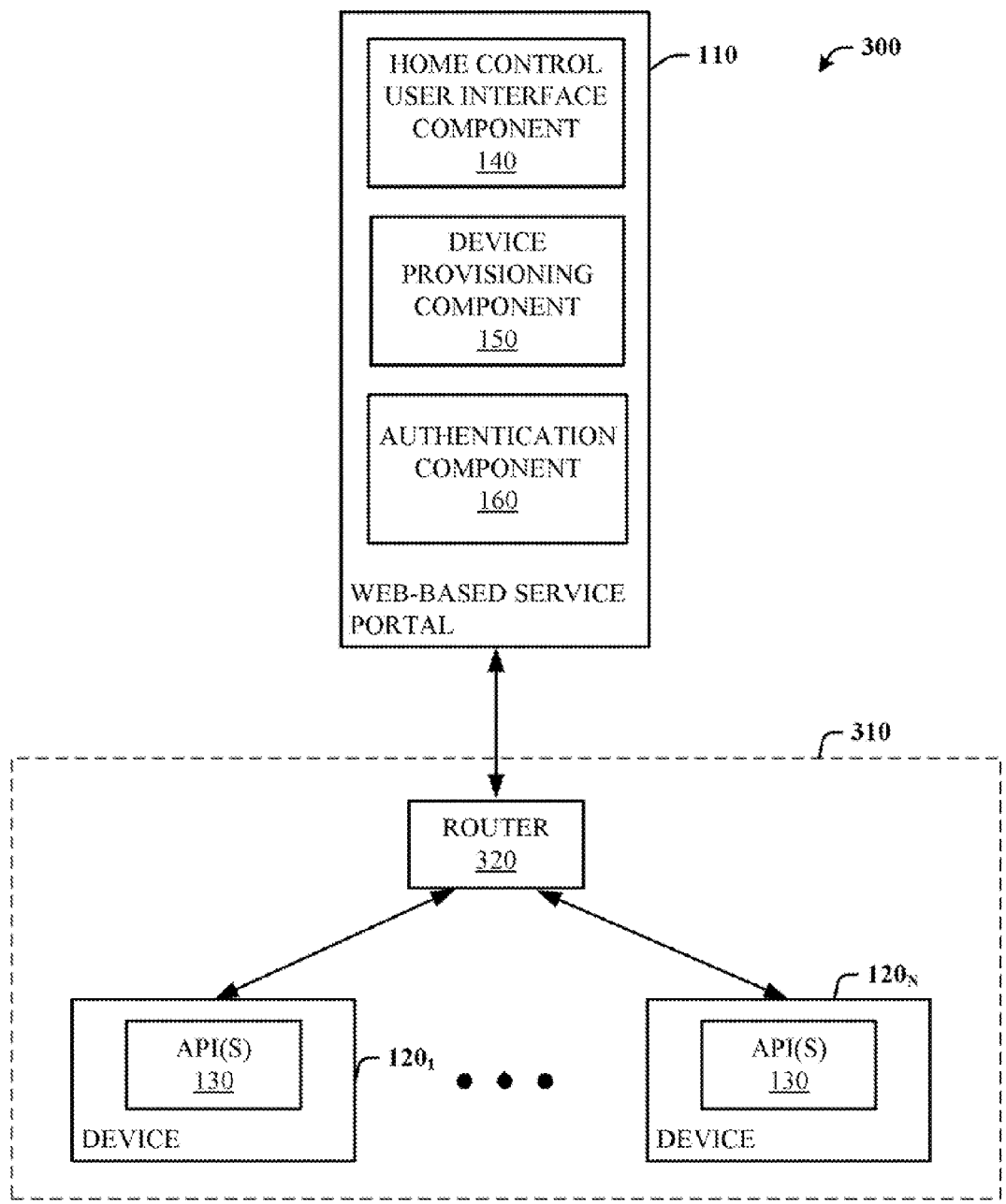
FIG. 3 illustrates a computer-implemented system that facilitates remote access of a home network.

FIG. 3 illustrates a computer-implemented system 300 that facilitates remote access of a home network 310. The system 300 includes a web-based service portal 110, a router 320 and one or more device(s) 120. The router 320 is a function-specific device 120 on the home network 310.

A user logs into the web-based service portal 110 through an authentication component 160. Once a user has been authenticated as authorized to access a particular home network 310, the user can modify setting(s) of device(s) 120 and/or access the device(s) 120.

In one embodiment, the web-based service portal 110 is Internet-based. Accordingly, the user can access the particular home network 310 from various locations (e.g., physically distant from the home network 310). For example, the web-based service portal 110 can provide a graphical representation of the home network 310 and allow the user to interact with device(s) 120 of the home network 310. The web-based service portal 110 can aggregate information associated with the home network 310.

For example, the home control user interface component 140 can provide a graphical representation of the home network 310 including icons for devices 120 on the home network 310. For example, a user can select an icon associated with a camera and select an access option (e.g., right click) in order to access the camera. Thus, the web-based service portal 110 is scenario-focused instead of settings-focused.

In one embodiment, the home control user interface component 140 can provide a graphical representation (e.g., network map) of the home network 310 that is interactive and customizable. For example, the graphical representation can allow a user to have custom names for device(s) 120, move device(s) 120 to represent a physical location of device(s) 120 in the user's home, and/or automatically configure device(s) 120 based on how a particular device 120 is moved around on a map and/or configured.

For example, if a user desires to view an Internet Protocol (IP) camera from the Internet, the user can right click on the camera icon that is displayed by the home control user interface component 140 and choose "view from Internet". Using the device APIs 130 and the web-based service portal 110, the process to configure the device(s) 120 to make this happen can be done automatically. The web-based service portal 110 can connect directly to the IP camera to enable video sharing and configure the required port(s). Further, the web-based service portal 110 can connect to the router 320 in the network 310 to forward the correct port(s) required and set up other feature(s) that may be required (e.g., quality of service). Once completed, the user can see a video stream associated with the IP camera (e.g., from anywhere on the Internet).

In one embodiment, the web-based service portal 110 can include an update function for networking device(s) 120. The update function can insure that device(s) 120 that are connected to the portal 110 are running a latest approved firmware (e.g., for the best user experience). The device 120 can report a current firmware version of the device 120 to the web-based service portal 110 where it is stored. When a new firmware image is released (e.g., via an update site), the user can be presented with options of manual update, automatic update and/or no update.

In another embodiment, the web-based service portal 110 can provide a remote interface and view of the home network 310 so a user that is on the Internet can get information about the home network 310 needed to provide support. For example, Internet Service Providers (ISPs) can support their customers without requiring the customer to understand the technology and/or interact with the device(s) 120. Accordingly, support costs and issues can be reduced by providing assistance through a lower cost method (e.g., online vs. phone) and/or configuration of the web-based service portal 110 to recognize a potential issue and automatically fix the issue.

For example, conventionally, if a customer wants to access the customer's NAS drive from the Internet, the customer would need to configure the router 320 firewall for access. Using the web-based service portal, the user can right click on the image of the NAS and choose to access it from the Internet. The user can also drag the NAS to the router 320 to achieve the same result. When a user does either of these actions (right click or drag/drop), the web-based service portal 110 can communicate with the router 320 and NAS drive (e.g., to automatically open the correct firewall ports and direct traffic through that port to the NAS drive). The customer does not need to log into any local web user interface and/or understand "port forwarding".

Figure 4:
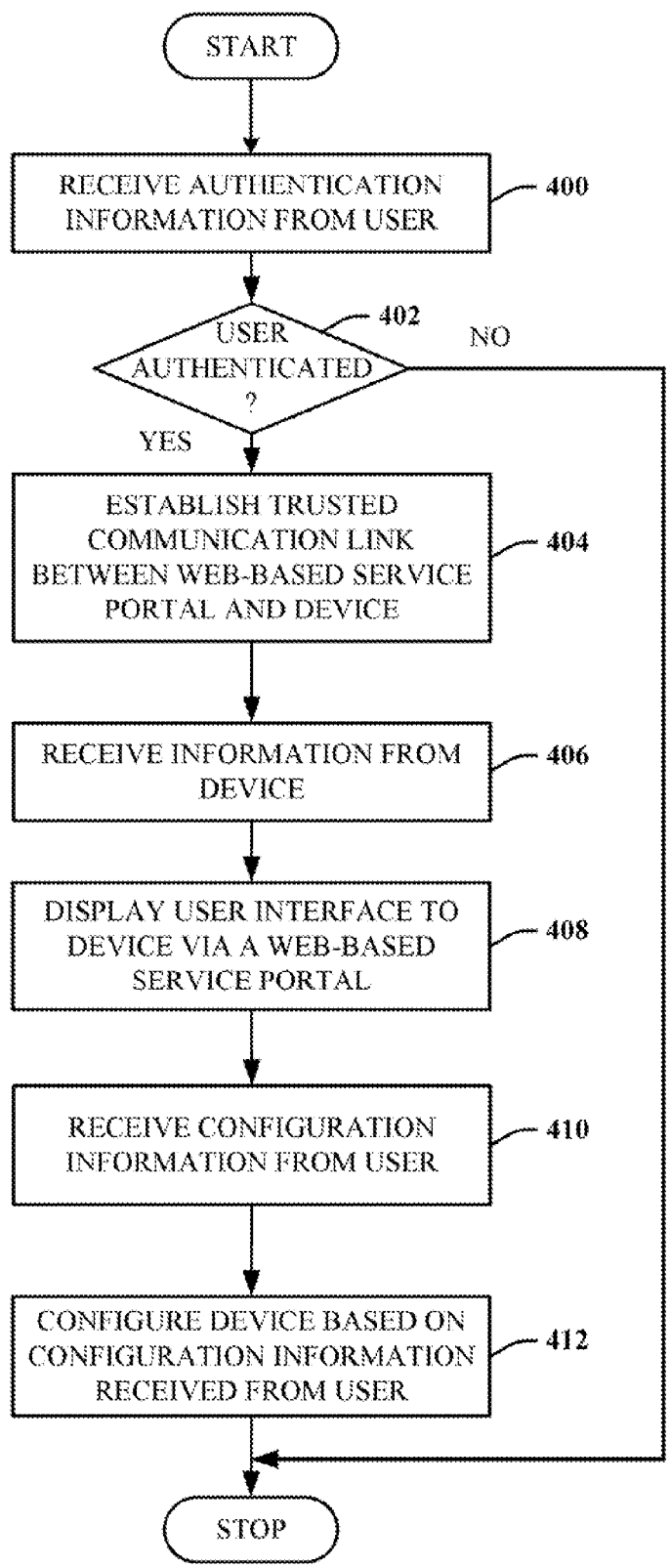
FIG. 4 illustrates a computer-implemented method of configuring a home network.

FIG. 4 illustrates a computer-implemented method of configuring a home network. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, authentication information is received from a user. For example, a user's right to configure and/or access device(s) 120 of a particular home network (e.g., guest access, wireless security setup, etc.) can be determined. At 402, a determination is made as to whether the user has been authenticated, for example, to access information regarding a particular home network. If the determination at 402 is NO, no further processing occurs and the method ends.

If the determination at 402 is YES, at 404, a trusted communication link is established between a web-based service portal and a device. At 406, information (e.g., available setting(s), default setting(s), configurable setting(s), etc.) is received from the device. At 408, information associated with the device is displayed to the user via the web-based service portal.

At 410, configuration information is received from the user. At 412, the device is configured based on the configuration information received from the user, and, the method ends.

Figure 5:
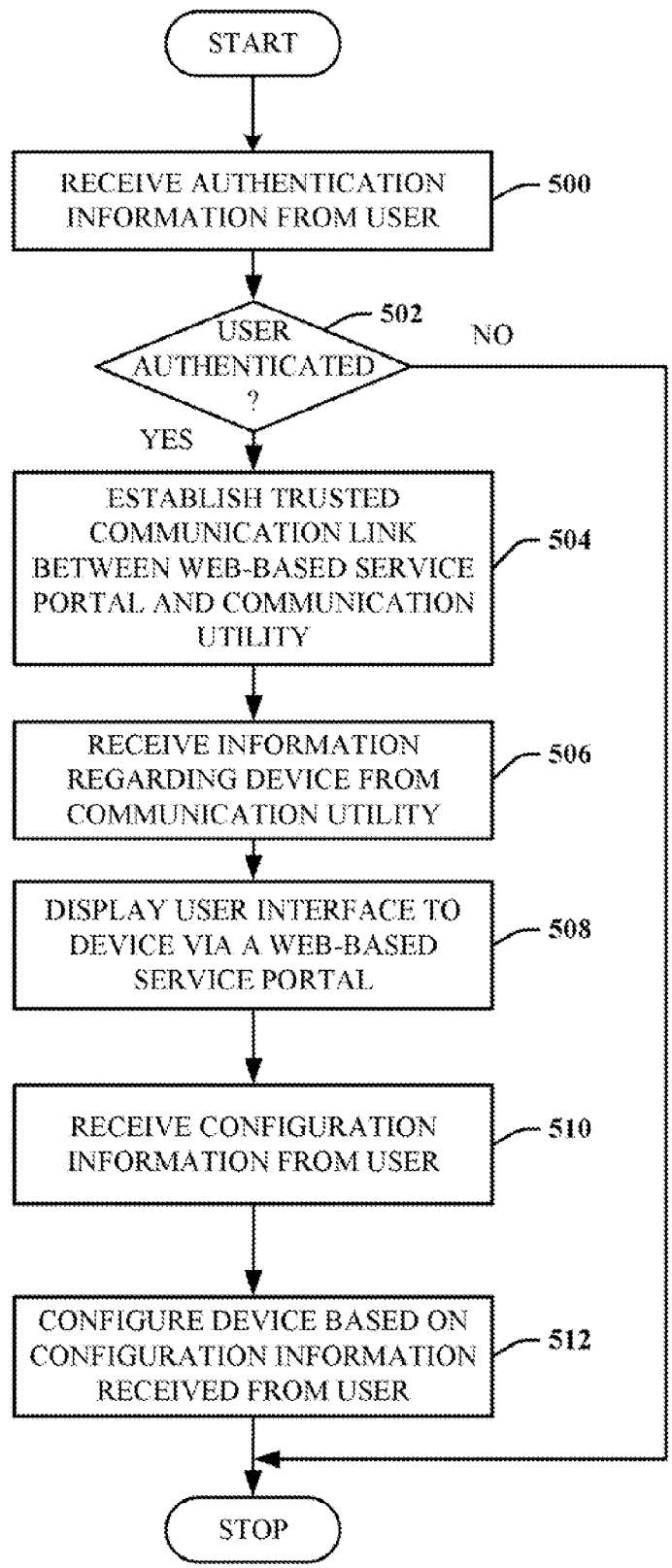
FIG. 5 illustrates a computer-implemented method of configuring a home network.

FIG. 5 illustrates a computer-implemented method of configuring a home network. At 500, authentication information is received from a user. At 502, a determination is made as to whether the user has been authenticated. If the determination at 502 is NO, no further processing occurs and the method ends.

If the determination at 502 is YES, at 504, a trusted communication link is established between a web-based service portal and a communication utility of a computer system. At 506, information regarding the device (e.g., available setting(s), default setting(s), configurable setting(s), etc.) is received the communication utility.

At 508, information associated with the device is displayed to the user via the web-based service portal. At 510, configuration information is received from the user. At 512, the device is configured via the communication utility based on the configuration information received from the user, and, the method ends.

Figure 6:
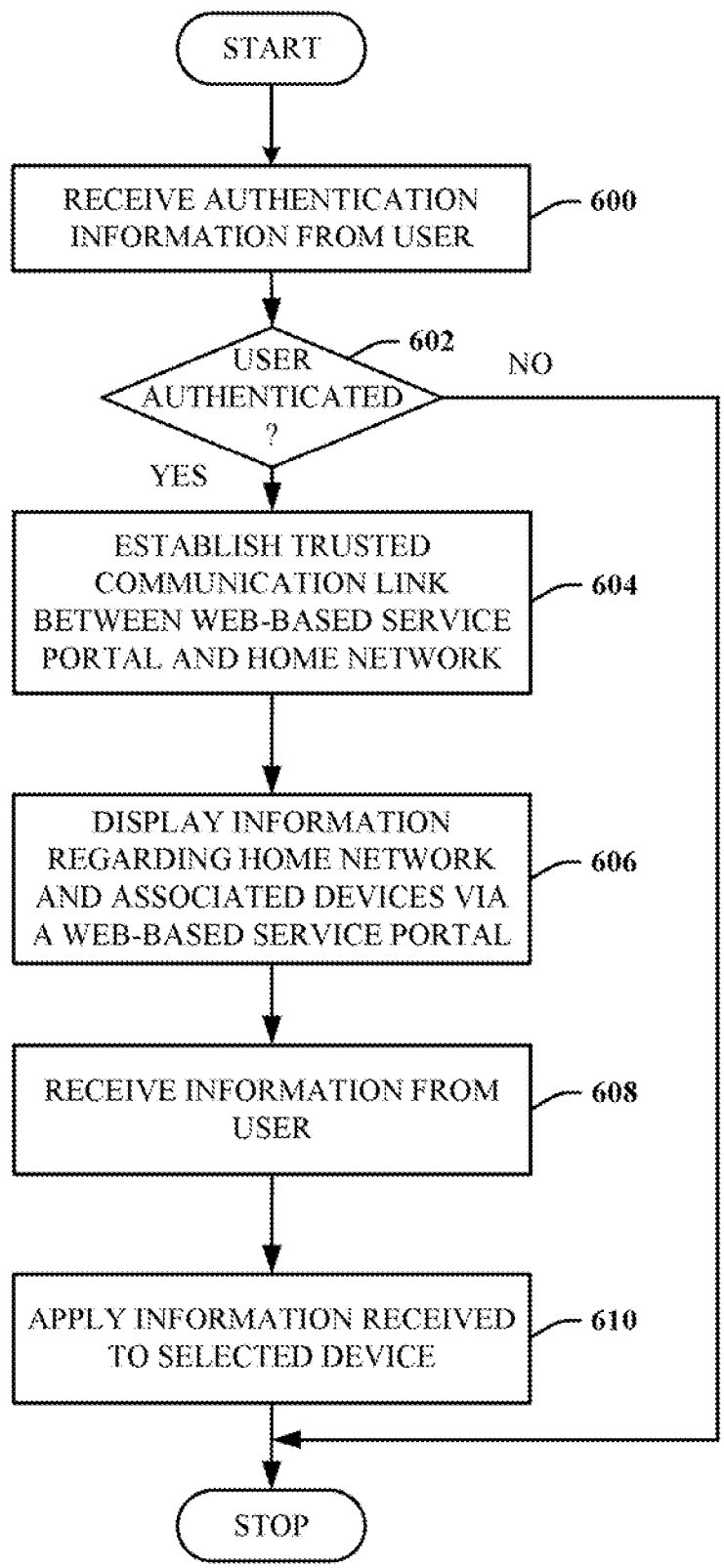
FIG. 6 illustrates a computer-implemented method of accessing a home network.

FIG. 6 illustrates a computer-implemented method of accessing a home network. At 600, authentication information is received from a user. At 602, a determination is made as to whether the user has been authenticated. If the determination at 602 is NO, no further processing occurs and the method ends.

If the determination at 602 is YES, at 604, a trusted communication link is established between a web-based service portal and a home network. At 606, information regarding the home network and associated device(s) is displayed via the web-based service portal.

At 608, information is received from the user. For example, the can select a device to configure and/or access. At 610, information received from the user is applied to a selected device. For example, the device configuration can be modified and/or the selected device can be accessed based on the information received from the user.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 7:
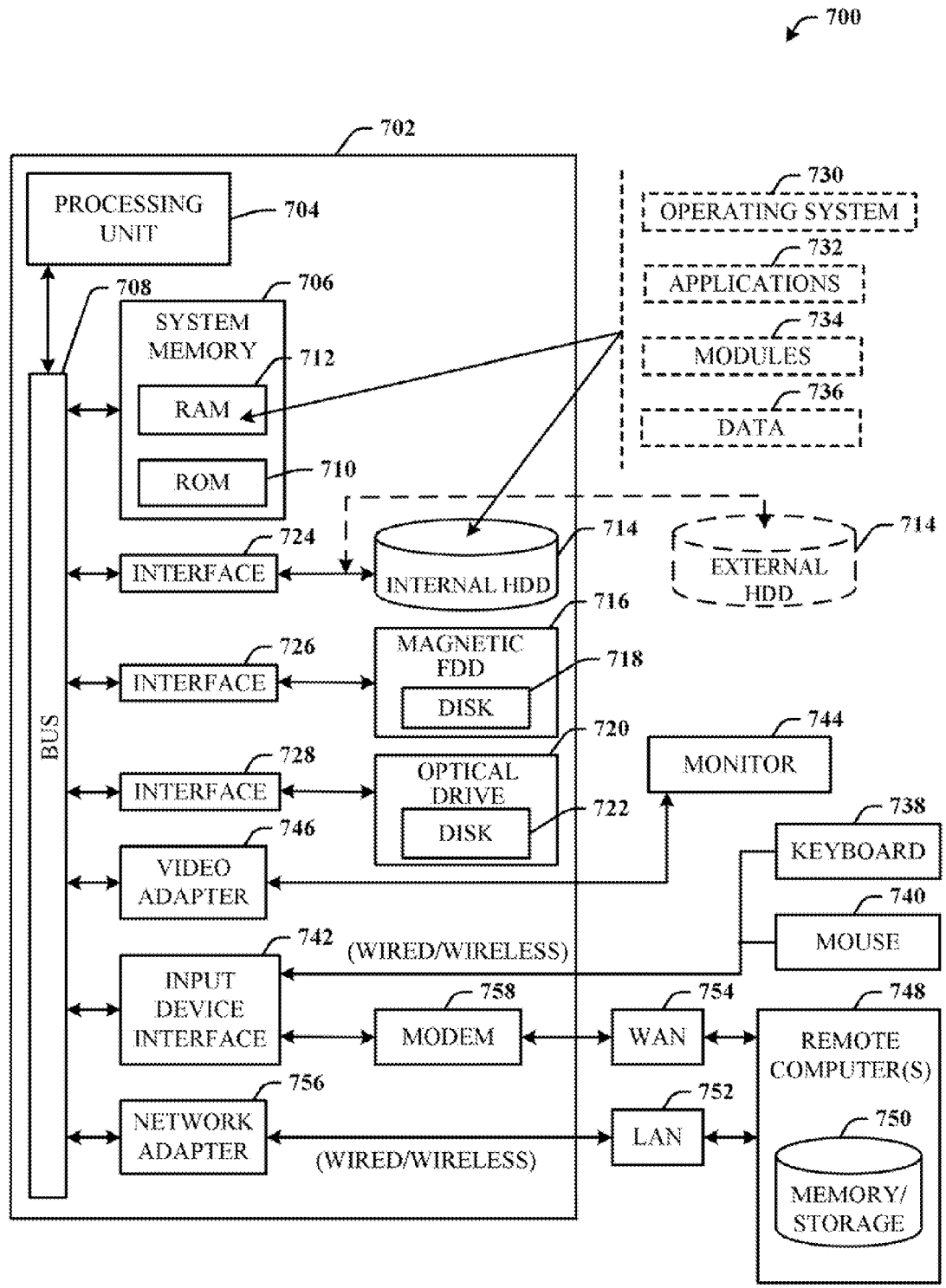
FIG. 7 illustrates a computing system operable to execute the disclosed architecture.

Referring now to FIG. 7, there is illustrated a block diagram of a computing system 700 operable to execute the disclosed web-based configuration and/or access of device(s) of a home network. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702, the computer 702 including a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in the read-only memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The internal hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 712, including an operating system 730, one or more application programs 732, other program modules 734 and program data 736. All or portions of the operating system, applications, modules, and/or data can also be cached in the RAM 712. It is to be appreciated that the disclosed architecture can be implemented with various commercially available operating systems or combinations of operating systems.

A user can enter commands and information into the computer 702 through one or more wired/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 8:
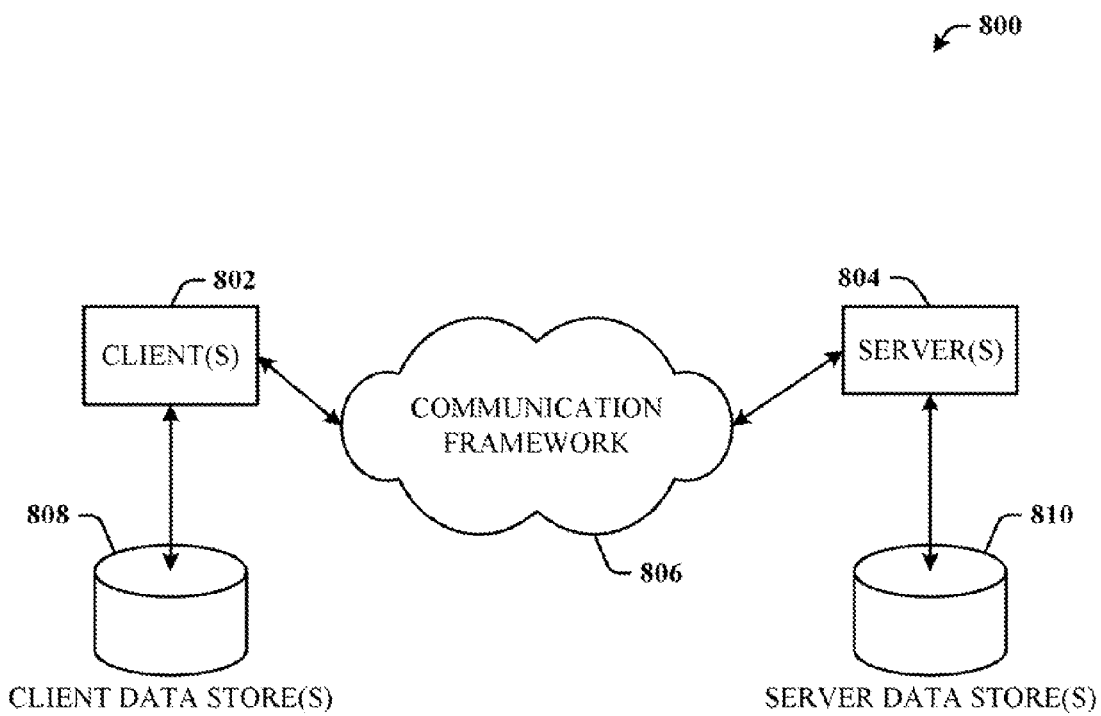
FIG. 8 illustrates an exemplary computing environment.

Referring now to FIG. 8, there is illustrated a schematic block diagram of an exemplary computing environment 800 that facilitates configuration of a home network. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates configuration of a network, comprising:
a service portal comprising:
an authentication component for establishing an encrypted trusted communication link between the service portal and at least one device;
a control user interface component for providing an interactive graphical representation of the network and configurable settings of the at least one device and receiving user input from a user;
logic configured to ensure that configuration information comprising at least one of the configurable settings of the at least one device received from the user will not cause conflicts with general network settings and settings of the at least one device; and,
a device provisioning component for, using the encrypted trusted communication link, discovering and configuring the at least one device based, at least in part, upon the received user input and pre-defined custom settings in a network profile stored in the service portal.

2. The system of claim 1, wherein the service portal communicates with the at least one device through a defined set of application program interfaces associated with the at least one device.

3. The system of claim 2, wherein the defined set of application program interfaces is XML-based.

4. The system of claim 1, wherein the encrypted trusted communication link is based on a secure hypertext transmission protocol.

5. The system of claim 1, wherein the user can provide information associated with the at least one device to be configured to the authentication component.

6. The system of claim 5, wherein the information associated with the at least one device comprises at least one of a serial number or a password.

7. The system of claim 1, wherein the at least one device is pre-configured with information to establish the encrypted trusted communication link.

8. The system of claim 1, wherein the user can configure the at least one device via the control user interface component.

9. The system of claim 1, wherein the control user interface component provides a standardized user interface for specific features of the at least one device.

10. The system of claim 1, wherein the device provisioning component configures at least one of an access right, a file sharing right, a name, or a setting of the at least one device.

11. The system of claim 1, wherein the control user interface component provides at least one of a drag and drop user interface and a right click functionality user interface to a user.

12. The system of claim 1, wherein the configurable settings comprise an Internet Protocol (IP) address of the at least one device.

13. A computer-implemented method of configuring a network, comprising:
establishing an encrypted trusted communication link between a service portal and a device of the network;
automatically configuring the device using pre-defined custom settings stored in the service portal;
receiving information from the device including configurable settings of the device;
ensuring that configuration information comprising at least one of the configurable settings of the device received from a user will not cause conflicts with general network settings and settings of the device; and,
displaying information associated with the device to the user via the service portal, the displayed information including the configurable settings of the device.

14. The method of claim 13, further comprising:
receiving authentication information from the user; and,
determining whether the user is authorized to access the network.

15. The method of claim 13, further comprising:
receiving configuration information from the user; and,
configuring the device based on the configuration information received from the user.

16. A computer-implemented method of accessing a network, comprising:
establishing an encrypted trusted communication link between a service portal and the network;
automatically configuring the device using pre-defined custom settings stored in the service portal;

receiving configurable settings of at least one or more associated devices;

ensuring that configuration information comprising at least one of the configurable settings of the at least one or more associated devices received from a user will not cause conflicts with general network settings and settings of the one or more associated devices; and displaying information regarding the network and the one or more associated devices via the service portal, the displayed information including the configurable settings of the one or more associated devices.

17. The method of claim 16, further comprising:

receiving authentication information from the user; and, determining whether the user is authorized to access the network.

18. The method of claim 16, further comprising:

receiving information from the user; and, applying information received from the user to a selected device.

19. The method of claim 18, further comprising accessing the selected device based on the information received from the user.

20. The method of claim 16, wherein the authentication information comprises at least one of a user name or a password.

* * * * *